United States Patent
Jacob et al.

(10) Patent No.: US 12,103,432 B2
(45) Date of Patent: Oct. 1, 2024

(54) METHOD FOR OPERATING AN ELECTRIC MACHINE OF A MOTOR VEHICLE, SYSTEM AND MOTOR VEHICLE

(71) Applicant: Bayerische Motoren Werke Aktiengesellschaft, Munich (DE)

(72) Inventors: Andreas Jacob, Munich (DE); Jovan Knezevic, Munich (DE); Raphael Weingartner, Garching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 80 days.

(21) Appl. No.: 17/778,222

(22) PCT Filed: Nov. 11, 2020

(86) PCT No.: PCT/EP2020/081748
§ 371 (c)(1),
(2) Date: May 19, 2022

(87) PCT Pub. No.: WO2021/115712
PCT Pub. Date: Jun. 17, 2021

(65) Prior Publication Data
US 2022/0402403 A1    Dec. 22, 2022

(30) Foreign Application Priority Data
Dec. 10, 2019    (DE) .............. 10 2019 133 634.1

(51) Int. Cl.
*B60L 58/27*    (2019.01)
*B60L 15/20*    (2006.01)
(Continued)

(52) U.S. Cl.
CPC ............... *B60L 58/27* (2019.02); *B60L 15/20* (2013.01); *B60L 58/26* (2019.02);
(Continued)

(58) Field of Classification Search
CPC .......... B60L 58/27; B60L 58/26; B60L 15/20; B60L 2220/14; B60L 2240/421;
(Continued)

(56) References Cited

U.S. PATENT DOCUMENTS

| | | |
|---|---|---|
| 2014/0070735 A1 | 3/2014 | Luedtke |
| 2017/0174039 A1 | 6/2017 | Schedel et al. |

(Continued)

FOREIGN PATENT DOCUMENTS

| | | |
|---|---|---|
| CN | 103684168 A | 3/2014 |
| CN | 106536259 A | 3/2017 |

(Continued)

OTHER PUBLICATIONS

Translation of DE102016212852 has been attached.*
(Continued)

*Primary Examiner* — Zoheb S Imtiaz
(74) *Attorney, Agent, or Firm* — Crowell & Moring LLP

(57) ABSTRACT

A method is provided for operating a synchronous machine that can be operated in an efficient operating mode and an inefficient operating mode. In order to provide a working-point-specific torque the synchronous machine is controlled in the efficient operating mode such that a stator of the synchronous machine generates a synchronous rotary field which rotates synchronously with a rotor of the synchronous machine. In order to increase dissipated heat of the synchronous machine, which can be used to heat at least one component of the motor vehicle, the synchronous machine is transferred into the inefficient operating mode in which an asynchronous rotary field acts on the synchronous rotary field, said asynchronous rotary field superimposing dissipated heat-increasing harmonics on a fundamental wave of the synchronous rotary field while maintaining the working-point-specific torque.

11 Claims, 2 Drawing Sheets

(51) Int. Cl.
  *B60L 58/26* (2019.01)
  *H01M 10/615* (2014.01)
  *H01M 10/625* (2014.01)
  *H01M 10/63* (2014.01)
  *H01M 10/663* (2014.01)
  *H01M 50/249* (2021.01)
  *H02P 29/62* (2016.01)

(52) U.S. Cl.
  CPC ....... *H01M 10/615* (2015.04); *H01M 10/625* (2015.04); *H01M 10/63* (2015.04); *H01M 10/663* (2015.04); *H01M 50/249* (2021.01); *H02P 29/62* (2016.02); *B60L 2220/14* (2013.01); *B60L 2240/421* (2013.01); *B60L 2240/425* (2013.01); *B60L 2240/545* (2013.01); *H01M 2220/20* (2013.01); *H02P 2207/05* (2013.01)

(58) Field of Classification Search
  CPC ........ B60L 2240/425; B60L 2240/545; H01M 10/615; H01M 10/625; H01M 10/63; H01M 10/663; H01M 50/249; H01M 2220/20; H02P 29/62; H02P 2207/05
  See application file for complete search history.

(56) References Cited

U.S. PATENT DOCUMENTS

| | | | |
|---|---|---|---|
| 2020/0228048 | A1 | 7/2020 | Engelhardt et al. |
| 2020/0274307 | A1* | 8/2020 | Young ................. H01L 23/492 |

FOREIGN PATENT DOCUMENTS

| | | | |
|---|---|---|---|
| DE | 10 2014 217 959 A1 | | 3/2016 |
| DE | 10 2016 211 762 A1 | | 1/2018 |
| DE | 10 2016 212 852 A1 | | 1/2018 |
| DE | 102016212852 | * | 1/2018 |
| DE | 10 2017 222 684 A1 | | 6/2019 |
| EP | 2 540 522 B1 | | 4/2016 |

OTHER PUBLICATIONS

International Search Report (PCT/ISA/210) issued in PCT Application No. PCT/EP2020/081748 dated Jan. 22, 2021 with English translation (six (6) pages).

German-language Written Opinion (PCT/ISA/237) issued in PCT Application No. PCT/EP2020/081748 dated Jan. 22, 2021 (five (5) pages).

German-language Search Report issued in German Application No. 10 2019 133 634.1 dated Sep. 16, 2020 with partial English translation (11 pages).

Chinese-language Office Action issued in Chinese Application No. 202080067073.6 dated Apr. 11, 2024 with English translation (20 pages).

* cited by examiner

METHOD FOR OPERATING AN ELECTRIC MACHINE OF A MOTOR VEHICLE, SYSTEM AND MOTOR VEHICLE

BACKGROUND AND SUMMARY OF THE INVENTION

The invention relates to a method for operating an electric machine in the form of a synchronous machine of a motor vehicle, which machine can be operated in an efficient operating mode with optimum power losses and in an inefficient operating mode which increases power losses, wherein, in the method, in order to provide an operating-point-specific torque, the synchronous machine is controlled in the efficient operating mode in such a way that a stator of the synchronous machine generates a synchronous rotating field which rotates synchronously with a rotor of the synchronous machine. Furthermore, in the method, in order to increase heat losses of the synchronous machine, which can be used to heat at least one component, which is to be heated, of the motor vehicle, the synchronous machine is transferred into the inefficient operating mode. The invention furthermore relates to a system comprising a synchronous machine and at least one component to be heated. The invention further relates to a motor vehicle comprising a system.

At present, the focus of interest is on motor vehicles which comprise an electric machine and at least one component to be heated. In the case that the motor vehicle is designed as an electrically driveable motor vehicle, the electric machine serves as the traction machine for the motor vehicle. To this end, the traction machine provides an operating-point-specific torque. The traction machine can be controlled for example using a field-oriented control, in which stator windings of a stator of the traction machine are supplied with a field-forming setpoint current and a torque-forming setpoint current in order to generate the operating-point-specific torque. An operating-point-specific torque can in this case be formed by different pairs of values of the field-forming setpoint current and the torque-forming setpoint current. In order to operate the traction machine here in an efficient operating mode with optimum power losses, the field-forming setpoint current and the torque-forming setpoint current are selected so that in particular the field-forming setpoint current and thus the field are as small as possible.

The traction machine can additionally serve as heating device for the at least one component, which is to be heated, of the motor vehicle. To this end, it is known from the prior art, for example EP 2 540 552 B1, to operate the traction machine in an inefficient mode which increases power losses and in which the traction machine outputs increased heat losses which can be supplied to the at least one component to be heated. In this case, the inefficient operating mode is provided by virtue of a pair of values which likewise generates the requested operating-point-specific torque but has an increased field-forming setpoint current being selected. The resulting losses are in this case primarily copper losses or winding losses which arise due to the ohmic resistance of the stator windings. Maximum possible heat losses which can be provided by the traction machine are limited by the maximum current.

It is the object of the present invention to provide an electric machine for a motor vehicle which in an inefficient operating mode can provide higher heat losses in comparison to the prior art.

This object is achieved according to the claimed invention.

A method according to an embodiment of the invention is used to operate an electric machine, in the form of a synchronous machine, of a motor vehicle, which machine can be operated in an efficient operating mode with optimum power losses and in an inefficient operating mode which increases power losses. In the method, in order to provide an operating-point-specific torque, the synchronous machine is controlled in the efficient operating mode in such a way that a stator of the synchronous machine generates a synchronous rotating field which rotates synchronously with a rotor of the synchronous machine. In order to increase heat losses of the synchronous machine, which can be used to heat at least one component, which is to be heated, of the motor vehicle, the synchronous machine is transferred into the inefficient operating mode in which an asynchronous rotating field acts on the synchronous rotating field, the asynchronous rotating field superposing power-loss-increasing harmonics on a fundamental wave of the synchronous rotating field while maintaining the operating-point-specific torque.

The invention furthermore relates to a system for a motor vehicle having a synchronous machine, at least one component to be heated and a control device which is designed to carry out a method according to an embodiment of the invention. The synchronous machine is preferably a traction machine of the motor vehicle and the at least one component to be heated is preferably a traction battery of the motor vehicle. The traction battery may be a high-voltage energy store. The traction battery provides the electrical energy for the traction machine and can be electrically connected to the traction machine for example by way of an inverter of the control device. The system comprises in particular a cooling circuit which conveys coolant and to which the synchronous machine and the at least one component, which is to be heated, of the motor vehicle are connected, wherein the control device is designed to provide the inefficient operating mode for the synchronous machine when the at least one component to be heated provides a heating requirement signal, wherein the heat losses output by the synchronous machine can be transported via the coolant of the cooling circuit to the at least one component to be heated. The synchronous machine can thus output heat losses generated in the inefficient operating mode to the coolant which transports the heat losses to the at least one component to be heated.

The synchronous machine comprises the stator and the rotor which is mounted so as to be able to rotate with respect to the stator. The synchronous machine may be a separately excited synchronous machine in which the rotor comprises energizable rotor windings or a permanently excited synchronous machine in which the rotor comprises permanent magnets. The stator comprises stator windings or phase windings which can be interconnected for example to form three winding strings u, v, w. These winding strings can be supplied with phase-shifted electric phase currents in order to generate a magnetic rotating field. The magnetic rotating field sets the rotor in a rotating movement in order to provide a torque. In a synchronous machine, the rotating field generated by the energized phase windings rotates synchronously with the rotor, with the result that an angular speed of the synchronous rotating field corresponds to an angular speed of the rotor. The angular speed of the rotor can be determined by way of the change in the rotor angle with respect to time. The phase windings can be fed for example by the inverter of the control device. In order to provide an operating-point-specific torque which is requested for example by a driver of the motor vehicle, the inverter applies setpoint phase voltages to the phase strings so that they are fed with predetermined setpoint phase currents by way of which the magnetic synchronous rotating field required to generate the operating-point-specific torque is generated. In the efficient operating mode, the control device determines the setpoint variables so that the power losses of the synchronous machine are minimal.

In order to now transfer the synchronous machine into the inefficient operating mode, the asynchronous rotating field which is superposed on the synchronous rotating field is generated. The asynchronous rotating field for increasing the heat losses is preferably always generated when the at least one component, which is to be heated, of the motor vehicle provides the heating requirement signal. The synchronous machine is thus transferred into the inefficient operating mode only when the at least one component to be heated has to be heated. The synchronous rotating field required for providing the operating-point-specific torque and the asynchronous rotating field required for increasing the heat losses are generated in the inefficient operating mode. The asynchronous rotating field does not generate a useful torque since it does not rotate synchronously with the rotor, with the result that the synchronous machine can generate the same operating-point-specific torque in the efficient operating mode and the inefficient operating mode. The asynchronous rotating field thus has no or only minimal effects on the torque which is generated by the synchronous rotating field.

The asynchronous rotating field merely leads to the fundamental wave of the synchronous rotating field, whose fundamental frequency is prescribed by the angular speed of the rotor, being superposed by harmonics. To this end, an angular speed of the asynchronous rotating field is different to the angular speed of the synchronous rotating field. In other words, a harmonic frequency is different to the fundamental frequency. By way of example, the angular speed of the asynchronous rotating field is significantly higher than that of the synchronous rotating field. In addition to the copper losses, the harmonics generate iron losses or remagnetization losses in the synchronous machine, the level of which depends on the harmonic frequency. If the stator is surrounded by a cooling jacket of the cooling circuit, the thermal connection to the stator is better than to the windings. As a result, the heat transmission to the coolant using iron losses can be configured more efficiently than using copper losses. Therefore, more heat can be transferred into the coolant using the same electrical power. The inverter for providing the inefficient operating mode of the synchronous machine also generates losses which can be used to heat the at least one component to be heated.

The frequency of the harmonics and thus the angular speed of the asynchronous rotating field are preferably prescribed depending on the heating power requested by the at least one component. Iron losses can generate a higher degree of heating of the synchronous machine in comparison with copper losses, with the result that the method according to an embodiment of the invention provided by way of the synchronous machine has a high efficiency with respect to the heating power which can be generated.

The frequency of the harmonics is preferably selected in such a way that a noise generated by the synchronous machine is below an uncomfortableness threshold, preferably below a hearing threshold, of human hearing. This embodiment is based on the knowledge that the particular high-frequency asynchronous rotating field can lead to the development of noise in the synchronous machine which can be perceived by human hearing. In this case, the harmonic frequency can be selected depending on the requested heat losses either such that the noise cannot be heard or can hardly be heard by humans or that it can at least not be perceived as uncomfortable.

Provision is preferably made for the synchronous machine for providing the operating-point-specific torque to be controlled using a field-oriented control. For this purpose, the control device comprises for example a controller which operates in a two-axis, rotor-oriented dq coordinate system. In this rotor-oriented coordinate system, the three stator-related electrical variables can be represented by two electrical variables. These two electrical variables can be represented in turn by a vector which rotates at the angular speed of the rotor in the dq coordinate system. By way of example, the three phase currents which are supplied to the phase windings to generate the rotating field can be represented by a current along the q axis which is referred to as torque-forming current and a current along the d axis which is referred to as field-forming current. In order to generate the synchronous rotating field which provides the required operating-point-specific torque, a field-forming setpoint current and a torque-forming setpoint current are prescribed, which currents are converted into the three-phase setpoint phase voltages for application to the phase windings. In this case, the field-forming setpoint current and the torque-forming setpoint current can be represented as a current vector which rotates at the angular speed of the rotor. In order to provide the efficient operating mode, the field-forming setpoint current and the torque-forming setpoint current are selected in such a way that the losses of the synchronous machine at the operating point are minimal.

In order to now generate the asynchronous rotating field, the field-forming setpoint current and/or the torque-forming setpoint current, and thus the current fundamental wave, are superposed by current harmonics. These current harmonics generate the harmonics which are superposed on the fundamental wave of the synchronous rotating field and increase the losses of the synchronous machine. Although the current harmonics also generate harmonics in the torque, these can be damped by way of the vehicle.

The invention furthermore includes a motor vehicle comprising a system according to an embodiment of the invention. The motor vehicle is in particular an electric or hybrid vehicle and comprises the synchronous machine as traction machine.

The embodiments and their advantages presented with respect to the method according to the invention accordingly apply to the system according to the invention and to the motor vehicle according to the invention.

Further features of the invention emerge from the claims, the figures and the description of the figures. The features and combinations of features mentioned above in the description as well as the features and combinations of features mentioned in the description of the figures below and/or shown solely in the figures can be used not only in the respectively stated combination, but also in other combinations or alone.

The invention is now explained in more detail on the basis of a preferred exemplary embodiment and with reference to the drawings.

DETAILED DESCRIPTION OF THE DRAWINGS

Identical or functionally identical elements are provided with the same reference signs in the figures.

Figure 1:
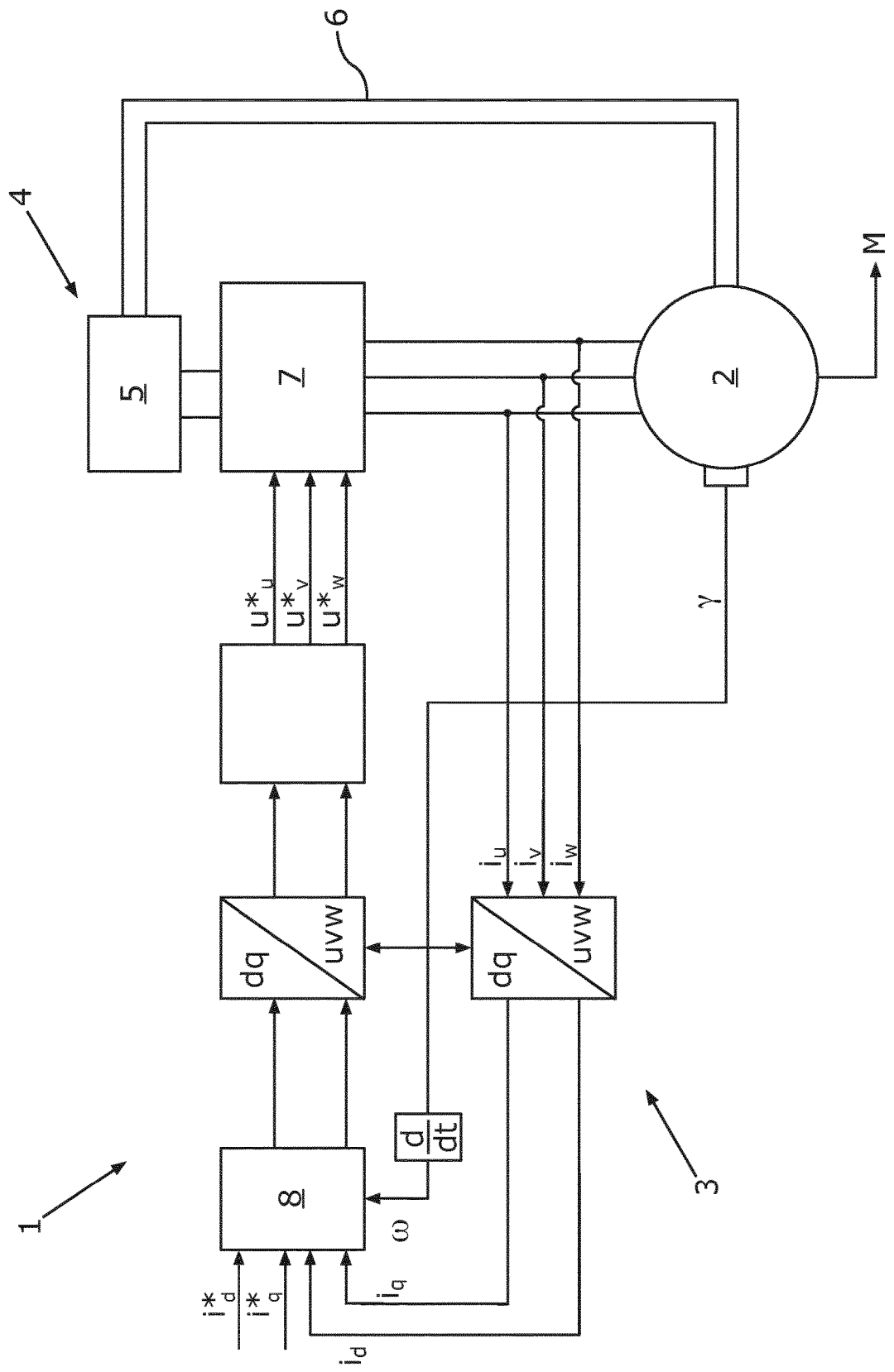
FIG. 1 shows a schematic illustration of an embodiment of a system comprising a synchronous machine in an efficient operating mode.
Figure 2:
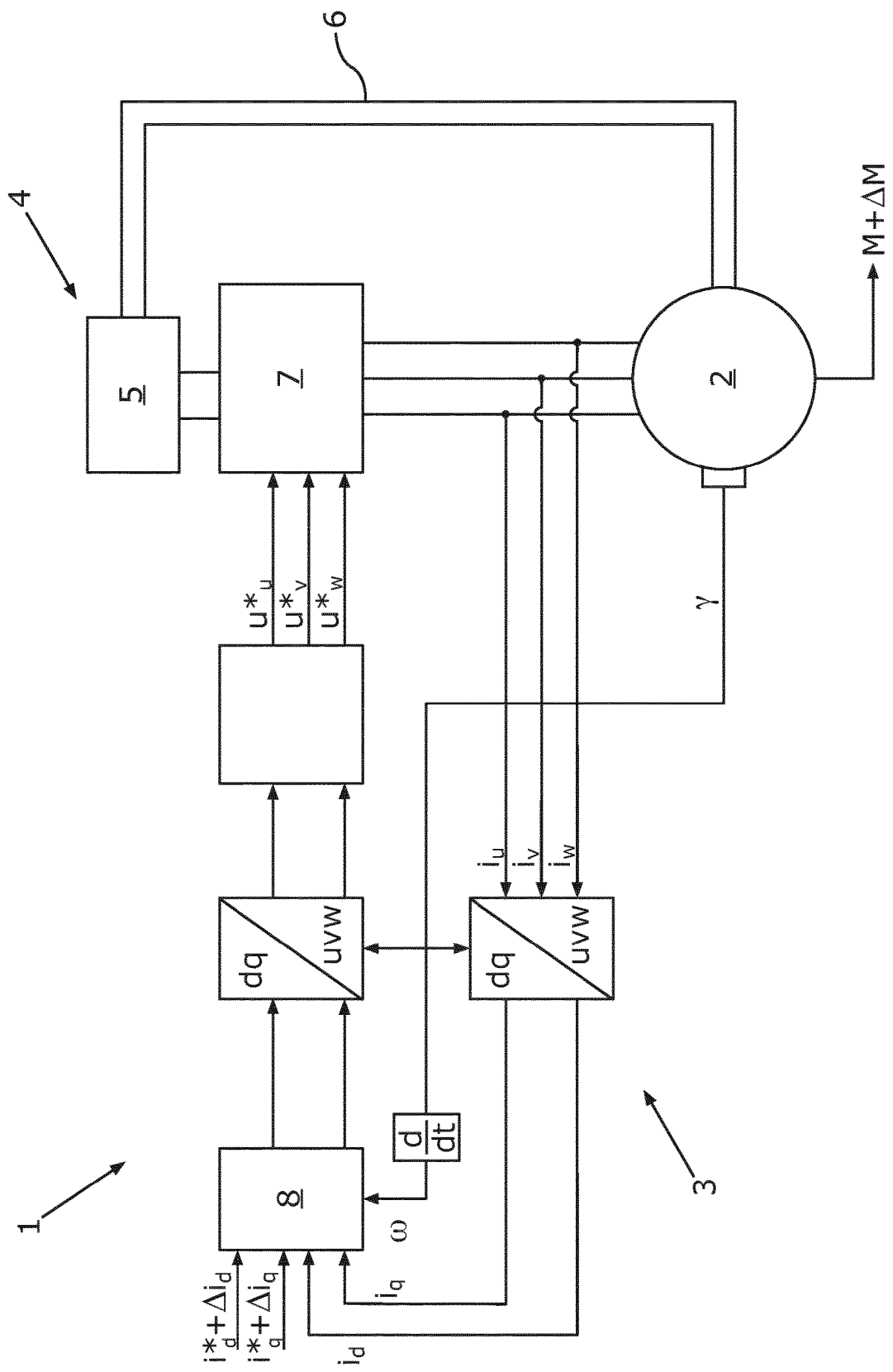
FIG. 2 shows the system according to FIG. 1 comprising the synchronous machine in an inefficient operating mode.

FIG. 1 and FIG. 2 each show a system 1 which comprises a synchronous machine 2 and a control device 3. The system 1 can be used in an electrically driveable motor vehicle in which the synchronous machine 2 serves as electric traction machine of the motor vehicle. The system 1 furthermore comprises at least one component 4 to be heated. The component 4 to be heated is in this case an electric traction battery 5 in the form of a high-voltage energy store which supplies electrical energy to the synchronous machine 2. The component 4 to be heated and the synchronous machine 2 are thermally coupled via a cooling circuit 6 which conveys coolant and is illustrated here only schematically. According to FIG. 1, the synchronous machine 2 is operated in an efficient operating mode in which the synchronous machine 2 outputs minimal power losses and thus heat losses. The efficient operating mode is provided whenever the component 4 to be heated has no heating requirement. According to FIG. 2, the synchronous machine 2 is operated in an inefficient operating mode in which the synchronous machine 2 has higher heat losses in comparison to the efficient operating mode. The inefficient operating mode is provided whenever the component 4 has a heating requirement. The component 4 is then supplied with the heat losses generated by the synchronous machine 2 by way of the coolant of the cooling circuit 6.

The control device 3 comprises an inverter 7 which is connected between the traction battery 5 and the synchronous machine 2. The inverter 7 is in particular likewise integrated into the cooling circuit 6 such that heating losses of the inverter 7 can additionally be transported to the component 4 to be heated. The inverter 7 is connected to three phase windings u, v, w of a stator of the synchronous machine 2. In order to be able to provide a required operating-point-specific torque M, the inverter 7 applies setpoint phase voltages $u^*_u$, $u^*_v$, $u^*_w$ to the three phase windings u, v, w of the synchronous machine 2, by way of which setpoint phase voltages the phase windings are energized using phase currents $i_u$, $i_v$, $i_w$. These phase currents $i_u$, $i_v$, $i_w$ generate a rotating field which sets a rotor of the synchronous machine 2 for providing the operating-point-specific torque M in rotation. The setpoint phase voltages $u^*_u$, $u^*_v$, $u^*_w$ are determined by a controller 8 of the control device 3 based on setpoint currents $i^*_q$ and $i^*_d$ and actual currents $i_d$, $i_q$. The controller 8 operates in this case in a two-axis, rotor-oriented dq coordinate system. The actual currents $i_d$, $i_q$ are a torque-forming actual current $i_q$ and a field-forming actual current $i_d$, which are determined based on the measured actual phase currents $i_u$, $i_v$, $i_w$. The measured actual phase currents $i_u$, $i_v$, $i_w$ are converted by way of coordinate transformation into the actual currents $i_d$, $i_q$. Since the dq coordinate system rotates at an angular speed ω of the rotor of the synchronous machine 2, the coordinate transformation is carried out taking into account a present measured rotor angle γ.

Since in the present synchronous machine 2 the usable torque M is generated only when the magnetic rotating field rotates synchronously with the rotor, that is to say when an angular speed of the synchronous rotating field rotates at the angular speed ω of the rotor, the setpoint phase voltages $u^*_u$, $u^*_v$, $u^*_w$ are determined depending on the change in the rotor angle γ with respect to time, which corresponds to the angular speed ω of the rotor. These setpoint phase voltages $u^*_u$, $u^*_v$, $u^*_w$ are converted into control signals for the inverter 7. The setpoint currents $i^*_q$ and $i^*_d$ are in this case determined in such a way that the required torque M is generated. The torque M is generated using $$M = 3/2 p(\Psi_d i^*_q - \Psi_q i^*_d)$$

with the number of pole pairs ρ, the flux linkage $\psi_d$ along the d-axis and the flux linkage along the q-axis.

In this case, there are different combinations of the setpoint currents $i^*_q$, $i^*_d$ which generate the same torque M. In the efficient operating mode, the values of the setpoint currents $i^*_q$, $i^*_d$ are selected in such a way that an amplitude of the current $I = \sqrt{i_q^{*2} + i_d^{*2}}$ is minimal.

In order to provide the inefficient operating mode, the synchronous rotating field is superposed by an asynchronous rotating field. The angular speed of the asynchronous rotating field is in this case different to, for example significantly greater than, the angular speed ω of the rotor, which also corresponds to the angular speed of the synchronous rotating field. The angular speed of the asynchronous rotating field can also be lower than the angular speed ω of the rotor. The asynchronous rotating field is generated by virtue of the setpoint currents $i^*_q$ and $i^*_d$ being superposed by harmonics $\Delta i_d$, $\Delta i_q$. $\Delta i_d$, $\Delta i_q$ can be calculated for example using:

$$\Delta i_d = Im^* \sin(\omega^2 t)$$

$$\Delta i_q = Im^* \cos(\omega^2 t)$$

These harmonics $\Delta i_d$, $\Delta i_q$ superpose harmonics which generate iron losses and thus increased heat losses on a fundamental wave of the synchronous rotating field. The resulting torque M+ΔM is calculated using $$M + \Delta M = 3/2 p(\Psi_d(i^*_q + \Delta i_q) - \Psi_q(i^*_d + \Delta i_d)),$$

wherein ΔM are harmonics in the torque M which are able to be damped by way of the motor vehicle. The heat losses generated by $\Delta i_d$, $\Delta i_q$ are supplied to the component 4 to be heated. In the inefficient operating mode, the synchronous machine 2 thus functions as a heating device for the component 4.

What is claimed is:

1. A method for operating an electric machine in a form of a synchronous machine of a motor vehicle, wherein the synchronous machine is operable in an efficient operating mode with optimum power losses and in an inefficient operating mode which increases power losses, the method comprising:
in order to provide an operating-point-specific torque, controlling the synchronous machine in the efficient operating mode such that a stator of the synchronous machine generates a synchronous rotating field which rotates synchronously with a rotor of the synchronous machine; and
in order to increase heat losses of the synchronous machine, wherein the heat losses are usable to heat at least one component of the motor vehicle, transferring the synchronous machine into the inefficient operating mode in which an asynchronous rotating field acts on the synchronous rotating field, wherein the asynchronous rotating field superposes heat-loss-increasing harmonics on a fundamental wave of the synchronous rotating field while maintaining the operating-point-specific torque.

2. The method according to claim 1,
wherein the inefficient operating mode of the synchronous machine for increasing the heat losses is provided when the at least one component provides a heating requirement signal.

3. The method according to claim 1,
wherein an angular speed of the asynchronous rotating field is different from an angular speed of the synchronous rotating field, such that a frequency of the harmonics is different from a frequency of the fundamental wave.

4. The method according to claim 3,
wherein the frequency of the harmonics and the angular speed of the asynchronous rotating field are prescribed depending on a heating power required by the at least one component.

5. The method according to claim 3,
wherein the frequency of the harmonics and the angular speed of the asynchronous rotating field are selected such that a noise of the synchronous machine resulting from the asynchronous field is below an uncomfortableness threshold of human hearing.

6. The method according to claim 5,
wherein the uncomfortableness threshold of human hearing is a hearing threshold of human hearing.

7. The method according to claim 1, wherein:
the synchronous machine for providing the operating-point-specific torque is controlled using a field-oriented control by prescribing a field-forming setpoint current and a torque-forming setpoint current in order to generate the synchronous rotating field, and
at least one of the setpoint currents is superposed by a current harmonic in order to generate the asynchronous rotating field.

8. A system for a motor vehicle, the system comprising:
the synchronous machine;
the at least one component; and
a control device which is configured to perform the method according to claim 1.

9. The system according to claim 8, further comprising:
a cooling circuit which conveys coolant and to which the synchronous machine and the at least one component are connected, wherein:
the control device is configured to provide the asynchronous rotating field for the synchronous machine when the at least one component provides a heating requirement signal, and
the heat losses output by the synchronous machine are transportable via the coolant of the cooling circuit to the at least one component.

10. The system according to claim 8,
wherein the at least one component is a traction battery and the synchronous machine is a traction machine of the motor vehicle.

11. A motor vehicle comprising the system according to claim 8.

* * * * *